United States Patent
Li et al.

(10) Patent No.: US 9,749,225 B2
(45) Date of Patent: *Aug. 29, 2017

(54) SOFTWARE DEFINED NETWORK (SDN) CONTROL SIGNALING FOR TRAFFIC ENGINEERING TO ENABLE MULTI-TYPE TRANSPORT IN A DATA PLANE

(71) Applicant: Huawei Technologies Co., LTD, Shenzhen (CN)

(72) Inventors: Xu Li, Nepean (CA); Hang Zhang, Nepean (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

This patent is subject to a terminal disclaimer.

(21) Appl. No.: 14/690,035

(22) Filed: Apr. 17, 2015

(65) Prior Publication Data

US 2016/0308758 A1    Oct. 20, 2016

(51) Int. Cl.
*H04L 12/721* (2013.01)
*H04L 12/725* (2013.01)
*H04L 12/751* (2013.01)

(52) U.S. Cl.
CPC .............. *H04L 45/38* (2013.01); *H04L 45/02* (2013.01); *H04L 45/304* (2013.01)

(58) Field of Classification Search
CPC ......... H04L 12/28; H04L 12/46; H04L 12/56; H04L 12/715; H04L 12/725;

(Continued)

(56) References Cited

U.S. PATENT DOCUMENTS 7,463,639 B1 * 12/2008 Rekhter .............. H04L 12/4641
                                                                370/409
8,837,470 B1 *  9/2014 Zhou .................... H04Q 11/08
                                                                370/357

(Continued)

FOREIGN PATENT DOCUMENTS

CN       1738308 A    2/2006
CN     103023773 A    4/2013

(Continued)

OTHER PUBLICATIONS

Bose, P., et al., "Routing with Guaranteed Delivery in ad hoc Wireless Networks," Wireless Networks, vol. 7, No. 6, pp. 609-616, 2001.

*Primary Examiner* — Tri H Phan
(74) *Attorney, Agent, or Firm* — Slater Matsil, LLP

(57) ABSTRACT

Aspects of this disclosure provide techniques for dynamically configuring flow splitting via software defined network (SDN) signaling instructions. An SDN controller may instruct an ingress network node to split a traffic flow between two or more egress paths, and instruct the ingress network node, and perhaps downstream network nodes, to transport portions of the traffic flow in accordance with a forwarding protocol. In one example, the SDN controller instructs the network nodes to transport portions of the traffic flow in accordance with a link-based forwarding protocol. In other examples, the SDN controller instructs the network nodes to transport portions of the traffic flow in accordance with a path-based or source-based transport protocol.

19 Claims, 13 Drawing Sheets

(58) Field of Classification Search
CPC ... H04L 12/751; H04L 12/4641; H04L 45/30; H04L 45/741; H04L 12/721; H04L 45/02; H04L 45/04; H04L 45/38; H04L 45/64; H04L 45/304; H04L 47/18
See application file for complete search history.

(56) References Cited

U.S. PATENT DOCUMENTS

| | | | | |
|---|---|---|---|---|
| 8,953,500 | B1* | 2/2015 | Shen | H04L 45/16 370/238 |
| 8,989,192 | B2* | 3/2015 | Foo | H04L 47/2441 370/392 |
| 9,203,752 | B2* | 12/2015 | Chen | H04L 12/4641 |
| 9,246,847 | B2* | 1/2016 | Mishra | H04L 69/04 |
| 9,276,877 | B1* | 3/2016 | Chua | H04L 45/02 |
| 9,325,609 | B2* | 4/2016 | Song | H04L 45/34 |
| 9,451,053 | B1* | 9/2016 | Jindal | H04L 69/08 |
| 2003/0088699 | A1* | 5/2003 | Luciani | H04L 12/4641 709/243 |
| 2007/0104119 | A1* | 5/2007 | Sarkar | H04L 12/4641 370/254 |
| 2008/0002588 | A1 | 1/2008 | McCaughan et al. | |
| 2011/0286466 | A1* | 11/2011 | Ge | H04L 45/04 370/401 |
| 2012/0213220 | A1* | 8/2012 | Troan | H04L 45/741 370/389 |
| 2013/0259035 | A1 | 10/2013 | Chen et al. | |
| 2014/0075557 | A1* | 3/2014 | Balabine | H04L 63/20 726/23 |
| 2014/0269729 | A1* | 9/2014 | Luo | H04L 45/74 370/392 |
| 2015/0043589 | A1* | 2/2015 | Han | H04L 45/38 370/392 |
| 2015/0055654 | A1 | 2/2015 | Song | |
| 2015/0071286 | A1* | 3/2015 | de Silva | H04L 45/586 370/392 |
| 2016/0234097 | A1* | 8/2016 | Chang | H04L 12/6418 |
| 2016/0269298 | A1* | 9/2016 | Li | H04L 47/18 |

FOREIGN PATENT DOCUMENTS

| | | |
|---|---|---|
| CN | 103347013 A | 10/2013 |
| CN | 103428306 A | 12/2013 |
| WO | 2005119978 A1 | 12/2005 |

\* cited by examiner

SOFTWARE DEFINED NETWORK (SDN) CONTROL SIGNALING FOR TRAFFIC ENGINEERING TO ENABLE MULTI-TYPE TRANSPORT IN A DATA PLANE

TECHNICAL FIELD

The present invention relates generally to software defined networks, and in particular embodiments, to techniques and mechanisms for software defined network (SDN) control signaling for traffic engineering to enable multi-type transport in a data plane.

BACKGROUND

Different packet transport networks use different schemes to route traffic over the data plane. For example, some packet transport networks use source routing protocols that allow a sender of a packet to partially or completely specify the pathway over which the packet is transported through the network. Other packet transport networks use non-source routing protocols to switch packets on a link-by-link basis such that en-route nodes are responsible for determining at least a portion of the pathway over which the packet is transported through the network. Different routing schemes may offer different advantages and disadvantages for different network scenarios. For example, source routing protocols may offer low complexity, while non-source routing protocols may provide better overall network performance.

SUMMARY OF THE INVENTION

Technical advantages are generally achieved, by embodiments of this disclosure which describe software defined network (SDN) control signaling for traffic engineering to enable multi-type transport in a data plane.

In accordance with an embodiment, a method for implementing flow splitting in software defined networking (SDN) topologies is provided. In this example, the method includes receiving a control signaling instruction from a controller. The control signaling instruction comprises routing information indicating at least one egress next-hop or egress pathway and at least one of a link-based flow transport protocol, a path-based flow transport protocol, and a source-based flow transport protocol. The at least one egress next-hop or egress pathway corresponds to one of the flow transport protocols. If the control signaling instruction indicates a path-based or source-based flow transport protocol, then the control signaling instruction may include at least one egress pathway associated with the path-based or source-based flow transport protocol. If the control signaling instruction indicates a link-based flow transport protocol, then the control signaling instruction may include at least one egress next-hop associated with the link-based flow transport protocol. The method further includes receiving a traffic flow or a traffic flow portion over an ingress link, and transmitting the traffic flow or the traffic flow portion to next hop network nodes over the at least one egress next-hop or egress pathway. An apparatus for performing this method is also provided.

In accordance with another embodiment, another method for implementing flow splitting in software defined networking (SDN) topologies is provided. In this example, the method comprises communicating a control signaling instruction to a network node of a packet switched domain. The control signaling instruction comprises routing information indicating at least one egress next-hop or egress pathway and at least one of a link-based flow transport protocol, a path-based flow transport protocol, and a source-based flow transport protocol. The at least one egress next-hop or egress pathway corresponds to one of the flow transport protocols. The routing information prompts the network node to forward a traffic flow or traffic flow portion over the at least one egress next-hop or egress pathway of the packet switched domain in accordance with a forwarding protocol indicated by the control signaling instruction. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
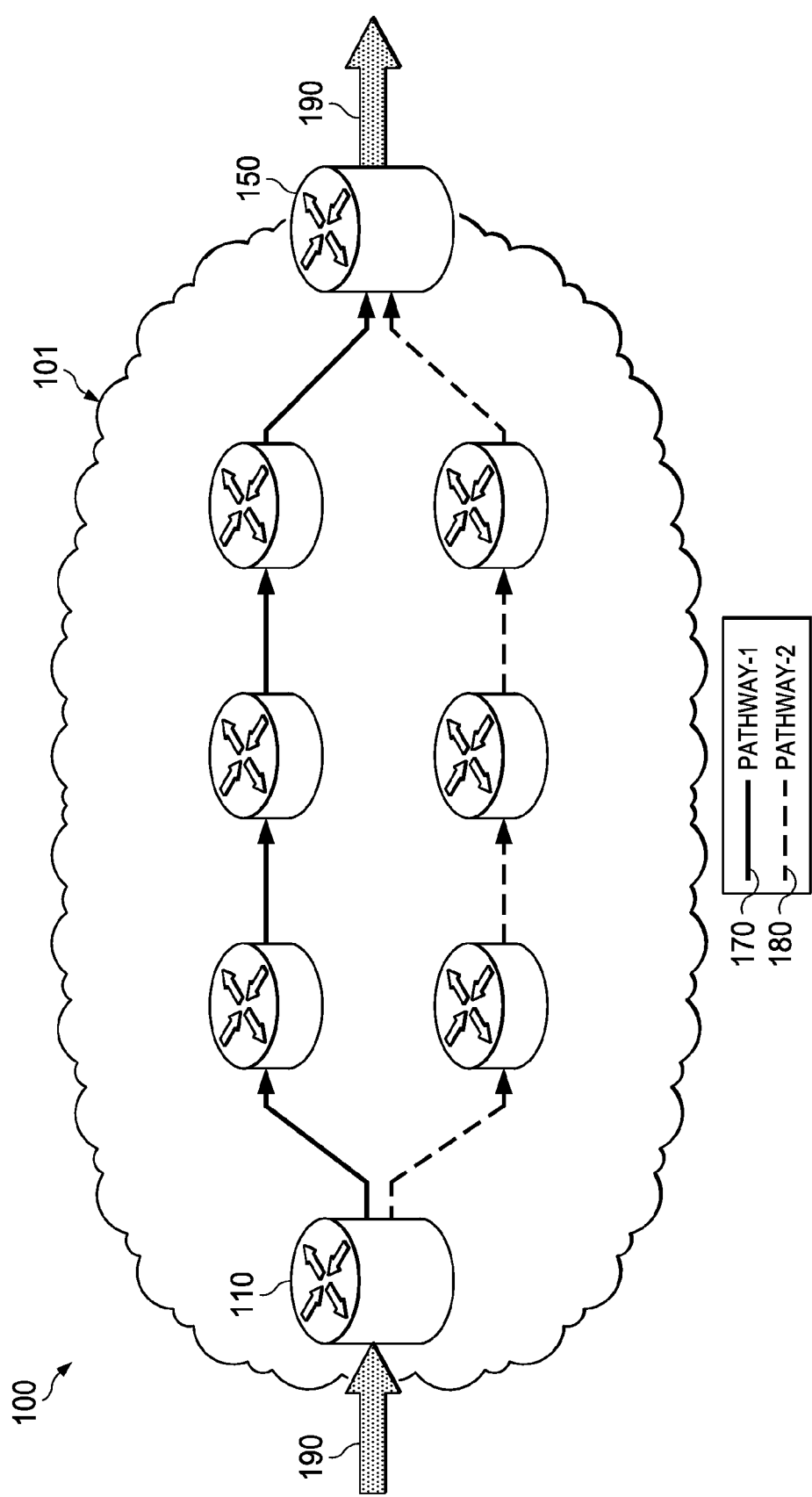
FIG. 1 illustrates a diagram of a network adapted to perform flow splitting.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

In some situations, it is advantageous to split a traffic flow between multiple pathways of a network domain such that different portions of the traffic flow are transported over the respective pathways. For example, flow splitting may be beneficial for large volume traffic flows, as well as for network domains having relatively low bandwidth links and/or paths. In conventional networks, flow splitting is statically configured at the ingress network nodes. For example, ingress network nodes may be configured to split traffic flows destined for a downstream node (e.g., an egress node) over two or more pre-defined pathways. Statically configuring flow-splitting protocols may be unable to adapt to changing conditions in next generation packet transport networks, which may experience substantial fluctuations in traffic loading, as well as periodic or occasional changes to their network topology, e.g., network nodes are added/removed from the network, etc. Accordingly, flexible techniques for dynamically configuring different flow splitting protocols in network domains are desired to fully leverage the benefits of flow splitting in next generation packet transport networks.

Aspects of this disclosure provide techniques for dynamically configuring flow splitting via software defined network (SDN) signaling instructions. More specifically, an SDN controller instructs an ingress network node to split a traffic flow between two or more egress paths, and instructs the ingress network node, and perhaps downstream network nodes, to transport portions of the traffic flow in accordance with a forwarding protocol. The SDN controller may select the forwarding protocol based on characteristics of the corresponding network domain (e.g., loading level, etc.) and/or capabilities of the nodes. In one embodiment, the SDN controller instructs the network nodes to transport portions of the traffic flow in accordance with a link-based forwarding protocol. In such an embodiment, the controller directly notifies the network nodes of next-hops along one or more egress pathways via control signaling. This allows the network nodes to forward the packets along the paths without referencing local routing tables. In another embodiment, the SDN controller instructs the network nodes to transport portions of the traffic flow in accordance with a path-based transport protocol. In such an embodiment, the controller sends a control signaling instruction to the ingress node to notify the ingress node of a path ID to append to the packets prior to forwarding the packets over their respective pathway(s). The controller also sends signaling instructions to nodes along the path to update their forward information base (FIB) tables to associate the path ID with the appropriate next-hop along the path. In another embodiment, the SDN controller instructs the network nodes to transport portions of the traffic flow in accordance with a source based transport protocol. In such an embodiment, the controller sends a control signaling instruction to the ingress node to notify the ingress node of a list of next-hop identifiers (e.g., a multiprotocol label switching (MPLS) label) to append to the packets. Notably, the path identifier used during path based transport may reduce the amount of data-plane overhead in the traffic flow, while the list of next-hop identifiers used during the source based transport may reduce the processing burden on downstream nodes, e.g., downstream nodes do not have to maintain large FIB table associating path identifiers with next-hop address, etc. In some embodiments, respective portions of a traffic flow communicated over different egress pathways are at least partially redundant. In such embodiments, the SDN controller may specify a maximum redundancy threshold that constrains the amount of redundancy between portions of the traffic flow split over the two or more egress pathways. In other embodiments, the respective portions may exhibit no redundancy, e.g., they may carry mutually exclusive subsets of packets. These and other aspects are explained in greater detail below.

Splitting traffic flows over different pathways may allow for higher throughput rates in network domains having relatively low bandwidth links/paths. FIG. 1 illustrates a network 100 adapted to split traffic flows over different pathways. As shown, a traffic flow 190 is received by an ingress node 110 of a packet switched domain 101. The ingress node 110 splits different portions of the respective traffic flow 190 over the respective pathways 170, 180 extending to an egress node 150 of the packet switched domain 101. Upon reception, the egress node 150 re-combines the split portions to re-construct the traffic flow 190, which is forwarded to an entity located outside of the packet switched domain 101.

Figure 2A:
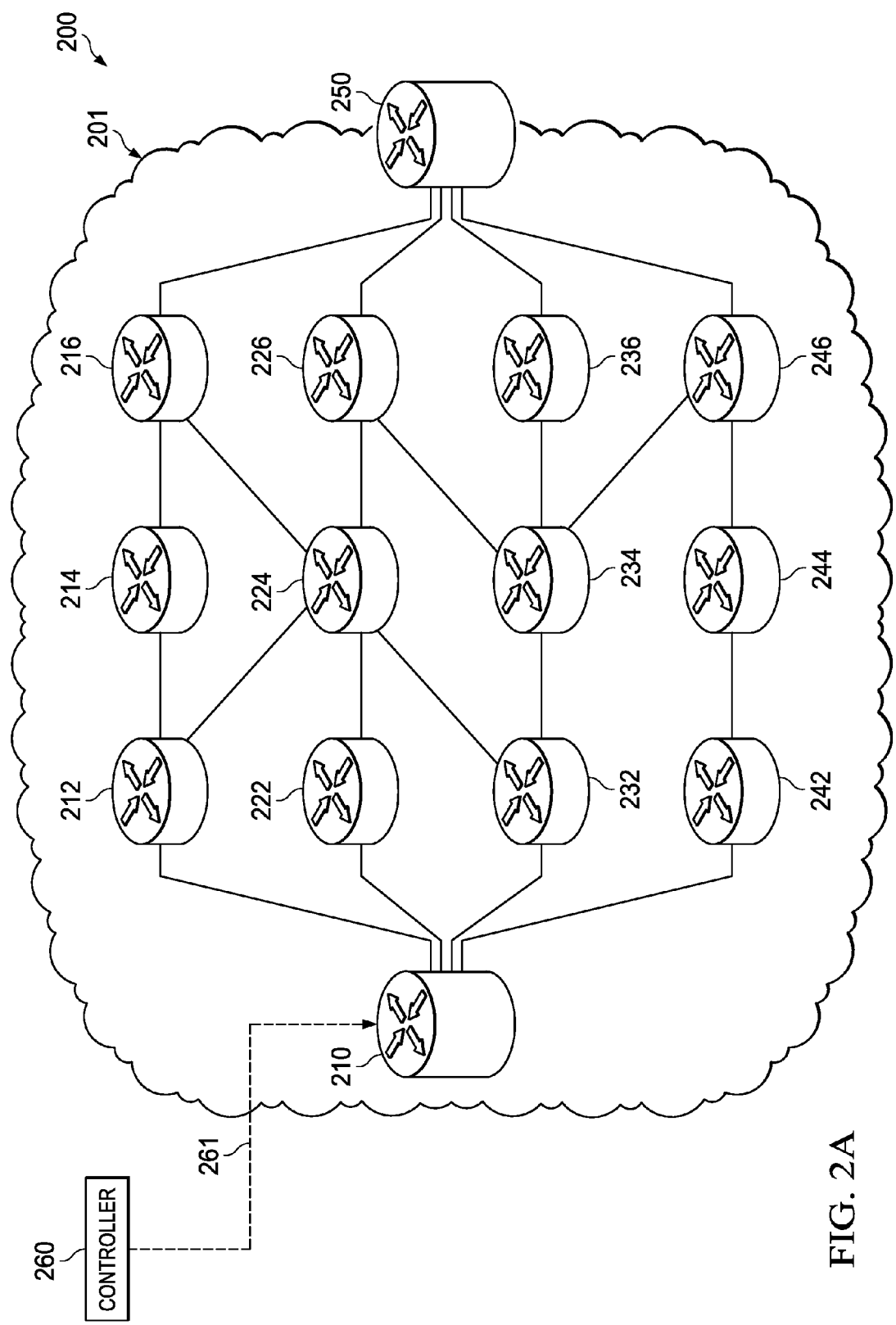
FIGS. 2A-2C illustrate diagrams of an embodiment network adapted to dynamically configure and utilize path-based or source-based flow splitting protocols.
Figure 2B:
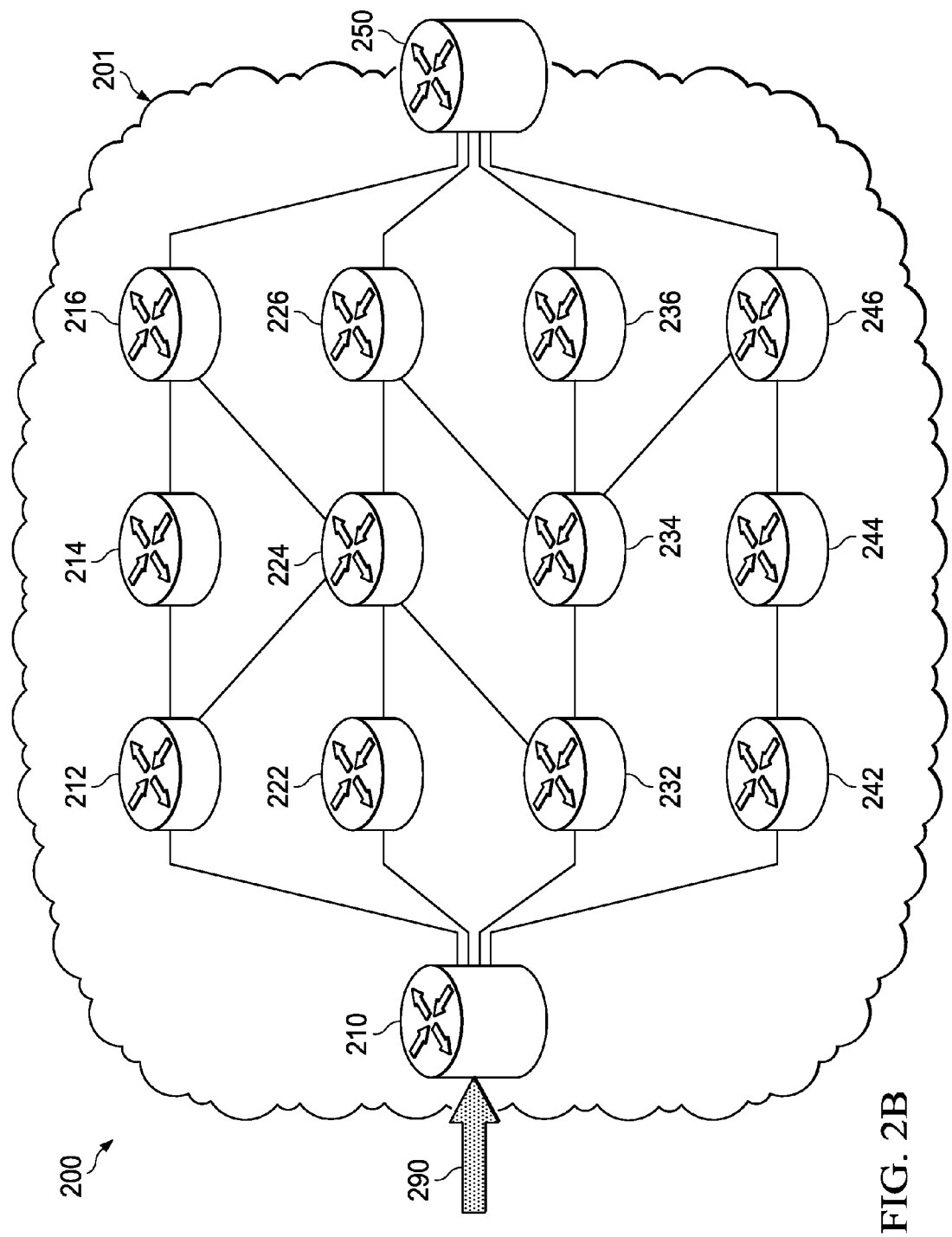
Figure 2C:
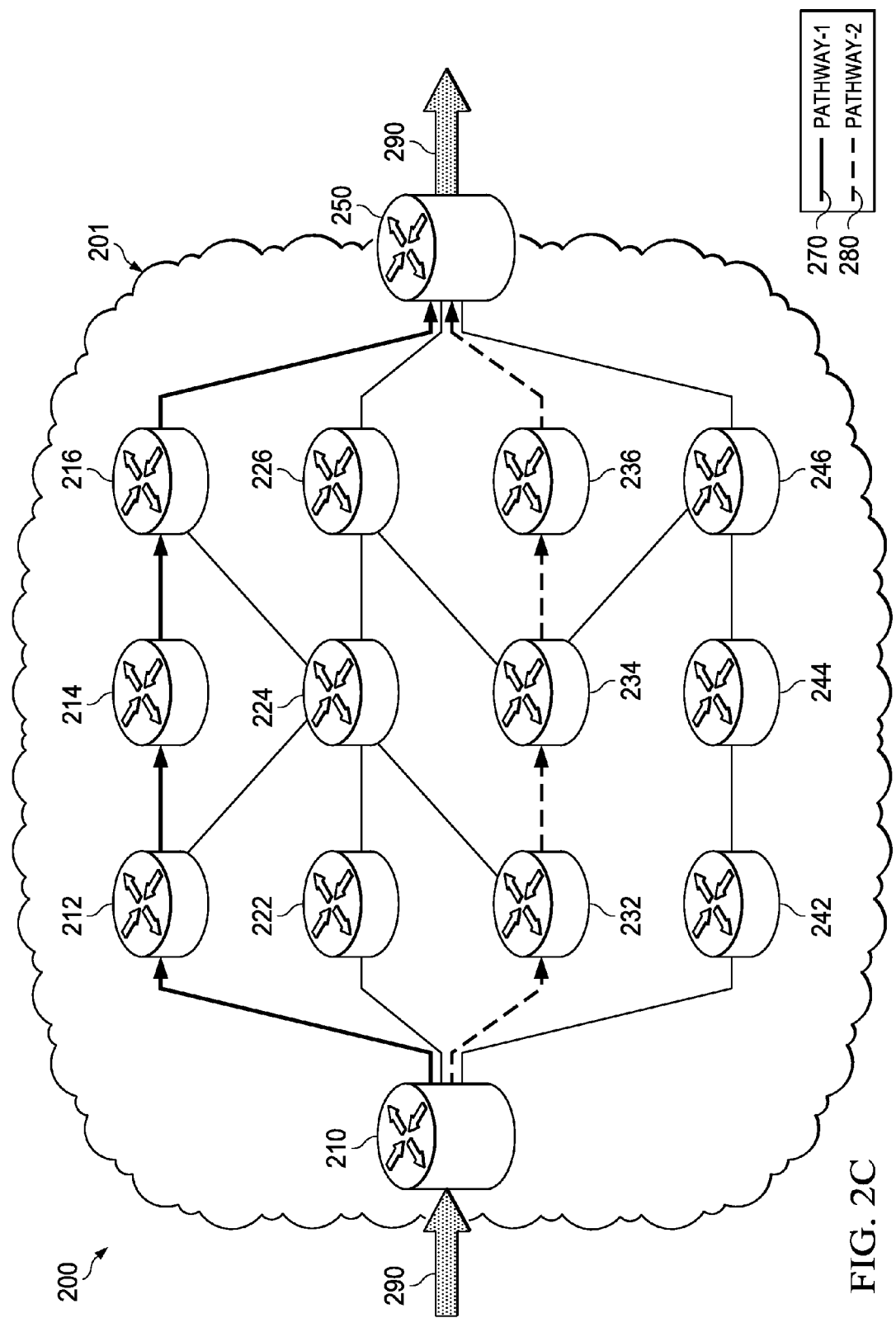

Different forwarding protocols can be used to forward portions of a traffic flow over paths. In some embodiments, the forwarding protocols are dynamically configured via software defined network (SDN) signaling. Notably, source-based forwarding protocols can be configured via SDN signaling. FIGS. 2A-2C illustrate an embodiment network 200 for dynamically configuring a flow splitting in a packet switched domain 201. The packet switched domain 201 includes an ingress node 210, a plurality of intermediate nodes 212-246, and an egress node 250. As shown in FIG. 2A, a controller 260 communicates a signaling instruction 261 to the ingress node 210 that instructs the ingress node to split traffic over egress paths. The controller 260 may be any type of control-plane entity, e.g., traffic engineering (TE) controller, software defined networking (SDN) controller, etc. The signaling instruction 261 may have a variety of different formats. For example, the signaling instruction 261 may include a forward information base (FIB) signaling instruction. As shown in FIG. 2B, a traffic flow 290 is then received at the ingress node 210, at which time the ingress node 210 determines that that the traffic flow 290 should be split based on the signaling instruction 261.

The ingress node 210 then forwards subsets of packets in the traffic flow 290 over two or more egress pathways specified by the signaling instruction 261. In this example, the signaling instruction 261 specifies a pathway 270 and a pathway 280 over which to forward respective portions of the traffic flow 290. As shown by FIG. 2C, the pathway 270 extends through the intermediate nodes 212, 214, 216 to the egress node 250, while the pathway 280 extends through the intermediate nodes 232, 234, 236 to the egress node 250. In some embodiments, the subsets of packets forwarded over the respective pathways 270, 280 are mutually exclusive such that there is zero-redundancy between portions of traffic communicated over the respective pathways 270, 280. In other embodiments, the subsets of packets forwarded over the respective pathways 270, 280 share at least some common packets such there is some redundancy between portions of traffic communicated over the respective pathways 270, 280. In such embodiments, the signaling instruction 261 may specify a maximum redundancy threshold/parameter between the respective pathways 270, 280 in order to constrain the amount (or ratio) of redundant packets communicated over the packet switched domain. A minimum redundancy threshold/parameter may be specified by the signaling instruction 261 in addition to, or instead of, the maximum redundancy threshold/parameter in some implementations.

In some embodiments, the signaling instruction 261 specifies a flow splitting rule. For example, the flow splitting rule may specify a splitting ratio (in terms of rate, packet count, or time). As Another example, the flow splitting rule may specify a path (or next hop) use policy. Such a policy can be priority-based, namely, one path (or next hop) has higher priority over another to be used unless its resource is used up. A high-priority path may have less traffic variation statistically. A path use policy can also be arbitrary, for example, to use multiple paths in a round-robin fashion, or to use them at random choice.

The signaling instruction 261 may further instruct the ingress node 210 to forward the corresponding portions of the traffic flow 290 over the respective pathways 270, 280 in accordance with a source-based forwarding algorithm. The signaling instruction 261 may further specify a list of next-hop addresses on the respective pathways. For example, the signaling instruction 261 may specify a list of next-hop addresses that includes addresses of the intermediate node 212, the intermediate node 214, the intermediate node 216, and the egress node 250 for packets forwarded over the pathway 270. Likewise, the signaling instruction 261 may specify a list of next-hop addresses that includes addresses of the intermediate node 232, the intermediate node 234, the intermediate node 236, and the egress node 250 for packets forwarded over the pathway 280.

Figure 3A:
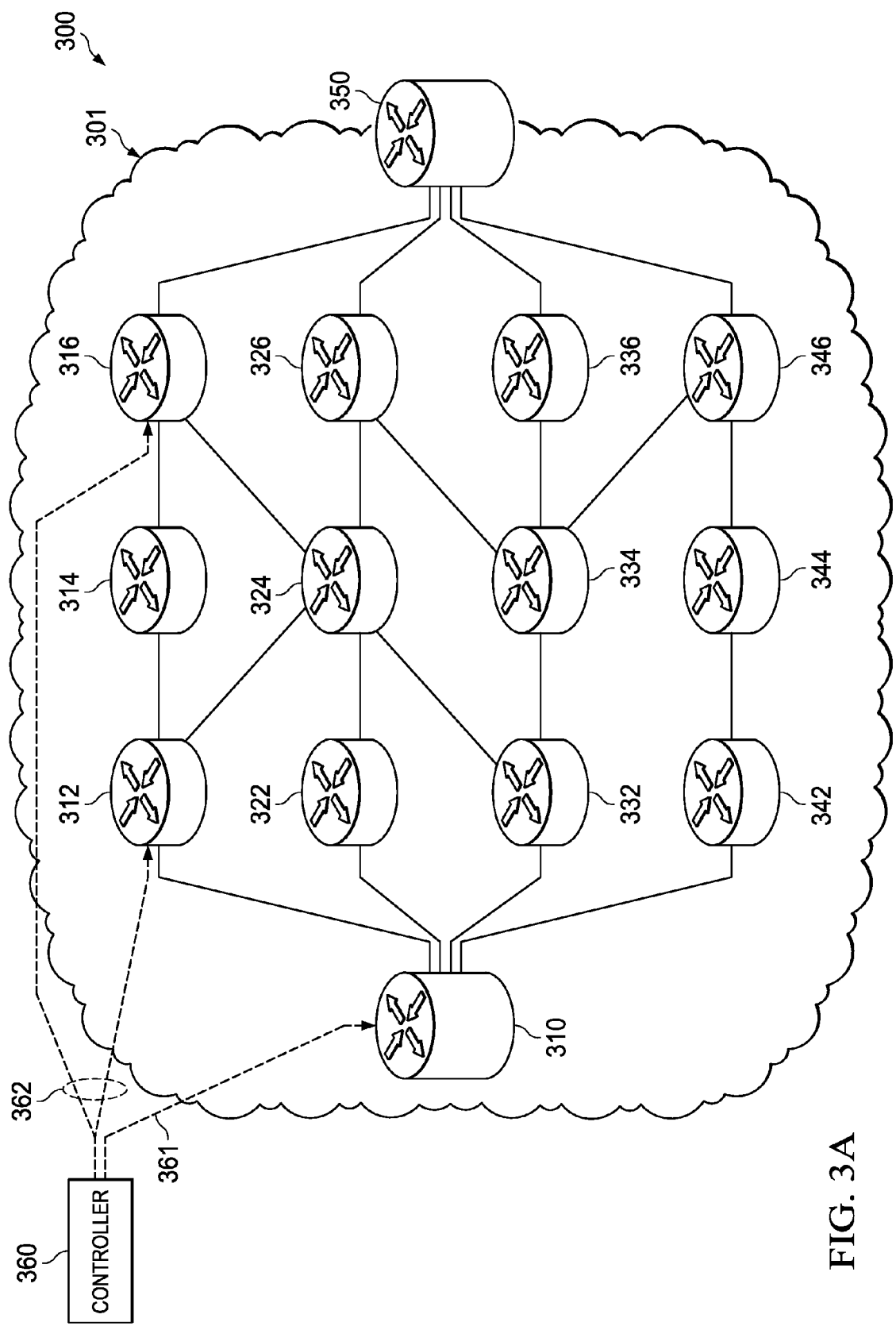
FIGS. 3A-3D illustrate diagrams of an embodiment network adapted to dynamically configure and utilize link-based flow splitting protocols.
Figure 3B:
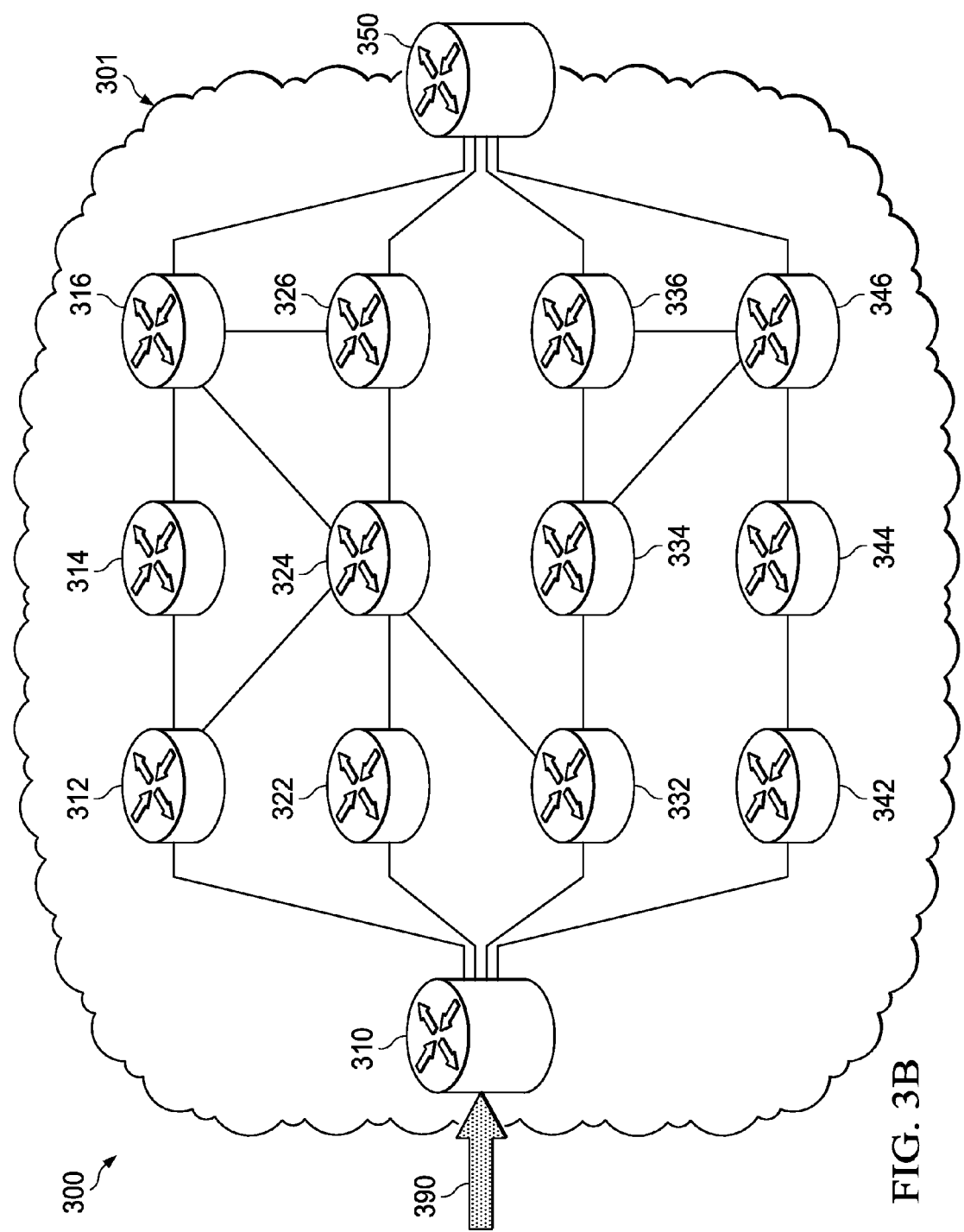
Figure 3C:
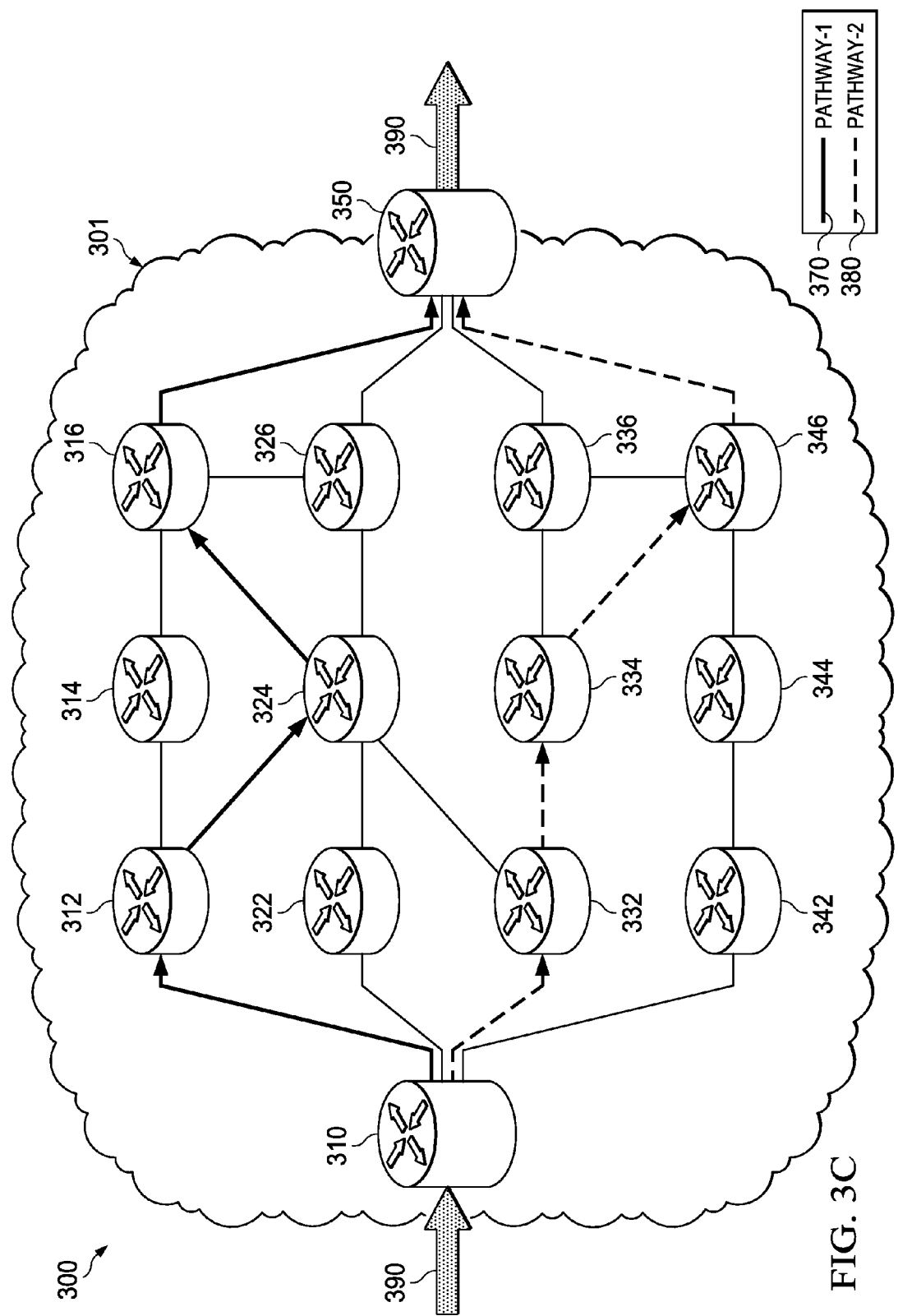
Figure 3D:
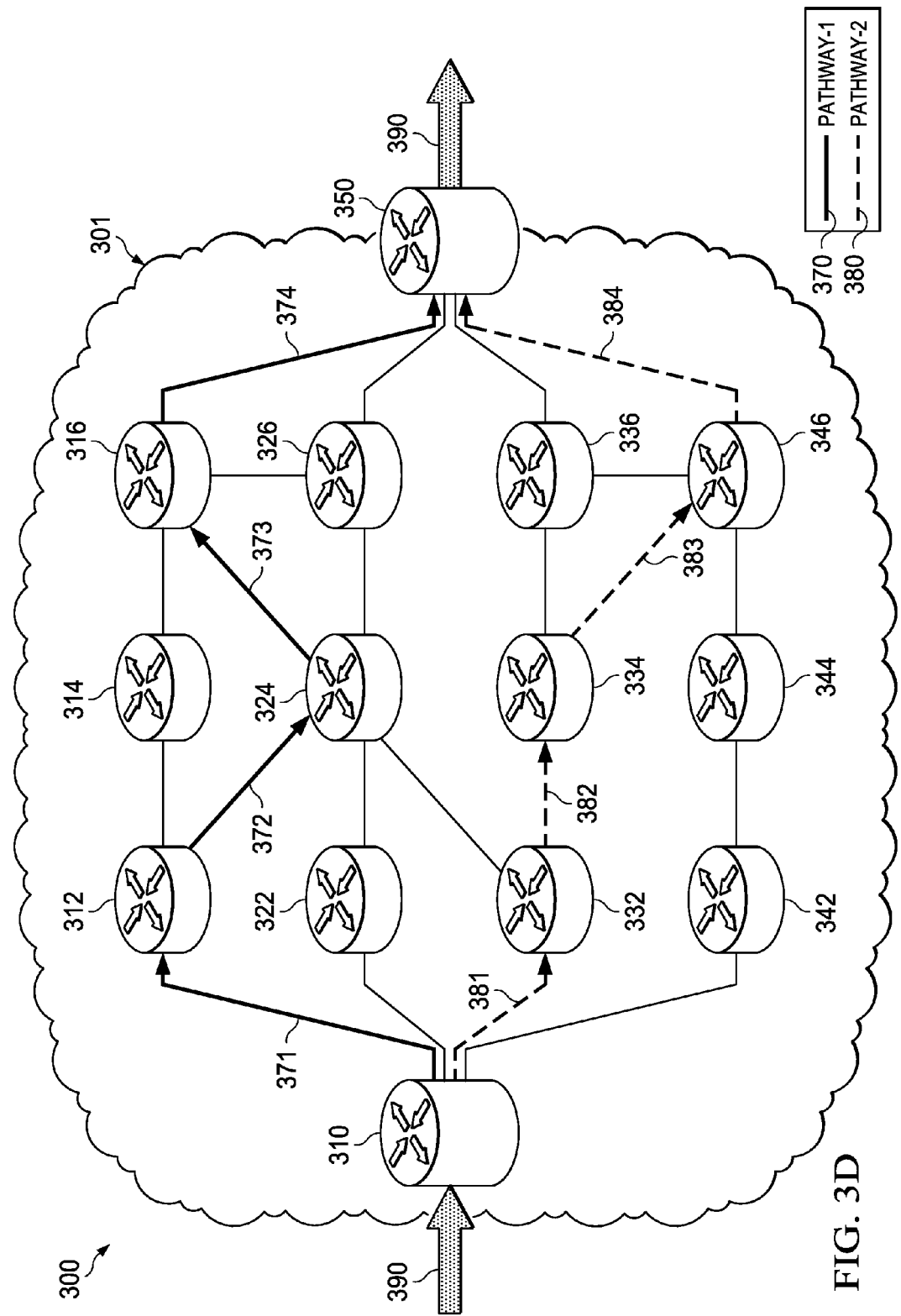

Link-based and path-based forwarding protocols may also be dynamically configured via SDN signaling. FIGS. 3A-3C illustrate an embodiment network 300 for dynamically configuring nodes to perform link-based or path-based forwarding protocols in a packet switched domain 301. The packet switched domain 301 includes an ingress node 310, a plurality of intermediate nodes 312-346, and an egress node 350. As shown in FIG. 3A, the controller 360 sends a signaling instruction 361 to the ingress node 310, and a signaling instruction 362 to at least some of the intermediate nodes 312-346. The signaling instruction 361 instructs the ingress node 310 to split a traffic flow over two paths, and to forward respective portions of the traffic flow in accordance with either a link-based and path-based forwarding protocol.

In one example, the signaling instruction 361 instructs the ingress node 310 to forward respective portions of the traffic flow in accordance with a path-based forwarding protocol. In such an example, the signaling instruction 361 specifies a path identifier associated with the respective pathway 370, 380 shown in FIG. 3C, and the signaling instructions 362 include FIB instructions to associate the corresponding path identifiers with next-hop addresses along the corresponding pathway. More specifically, the signaling instruction 361 may associated a first path identifier ($P_{ID1}$) with the pathway 370, and a second path identifier ($P_{ID2}$) with the pathway 380. Likewise, the signaling instructions 362 may associate the first path identifier ($P_{ID1}$) with a corresponding next-hop address on the pathways 370, 380, and may be used to update FIB tables in the intermediate nodes. For example, the signaling instructions 362 may: prompt the intermediate node 312 to update its FIB table to associate the first path identifier ($P_{ID1}$) with the next-hop address of the intermediate node 324; prompt the intermediate node 314 to update its FIB table to associate the first path identifier ($P_{ID1}$) with the next-hop address of the intermediate node 316; and prompt the intermediate node 316 to update its FIB table to associate the first path identifier ($P_{ID1}$) with the next-hop address of the egress node 350. Likewise, the signaling instructions 362 may: prompt the intermediate node 332 to update its FIB table to associate the second path identifier ($P_{ID2}$) with the next-hop address of the intermediate node 334; prompt the intermediate node 334 to update its FIB table to associate the second path identifier ($P_{ID2}$) with the next-hop address of the intermediate node 346; and prompt the intermediate node 346 to update its FIB table to associate the second path identifier ($P_{ID2}$) with the next-hop address of the egress node 350. Thereafter, portions of the traffic flow 390 can be forwarded along their respective pathways 370, 380 in accordance with the path-based forwarding protocol. This may allow the respective en-route nodes to forward the packets based on the corresponding path identifier, thereby reducing overhead when compared to source-based forwarding. Upon receiving the respective portions of the traffic flow 390 over the pathways 370, 380, the egress node 350 may reconstruct the traffic flow 390, and then forward the reconstructed traffic flow 390 to a destination (or next-hop) outside of the packet switched domain 301.

In another example, the signaling instruction 361 instructs the ingress node 310 to forward respective portions of the traffic flow in accordance with a link-based forwarding protocol. In such an example, the signaling instruction 361 directly instructs the ingress node to forward a first portion of the traffic flow 390 over the link 371, and a second portion of the traffic flow 390 over the link 381. Likewise, the signaling instructions 362 directly instruct the intermediate nodes 312, 324, and 316 to forward the first portion of the traffic flow 390 over the links 372, 373, and 374 (respectively) of the pathway 370. Similarly, the signaling instructions 362 directly instruct the intermediate nodes 332, 334, and 346 to forward the second portion of the traffic flow 390 over the links 382, 383, and 384 (respectively) of the pathway 380.

Figure 4:
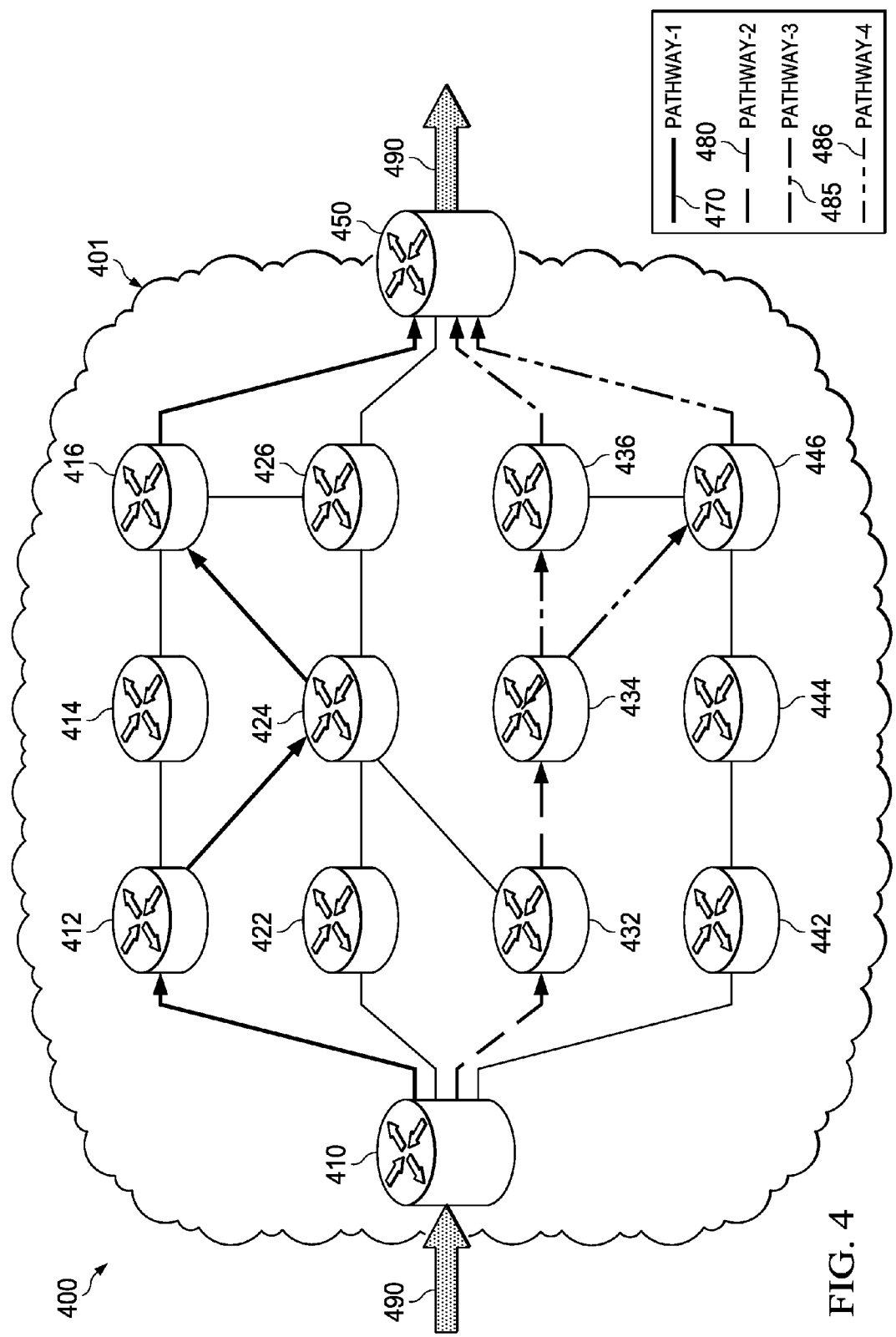
FIG. 4 illustrates a diagram of another embodiment network adapted to utilize a link-based flow splitting protocol in a packet switched domain.

In some embodiments, downstream nodes to further split portions of a traffic flow over different intermediate pathways. FIG. 4 illustrates an embodiment network 400 for splitting a traffic in a packet switched domain 401. In this example, a traffic flow 490 is split in-between the pathways 470, 480 at the ingress node 410. Subsequently, the portion of the traffic flow forwarded over the pathway 480 is further split in-between the pathways 485, 486 at the intermediate node 434.

Figure 5:
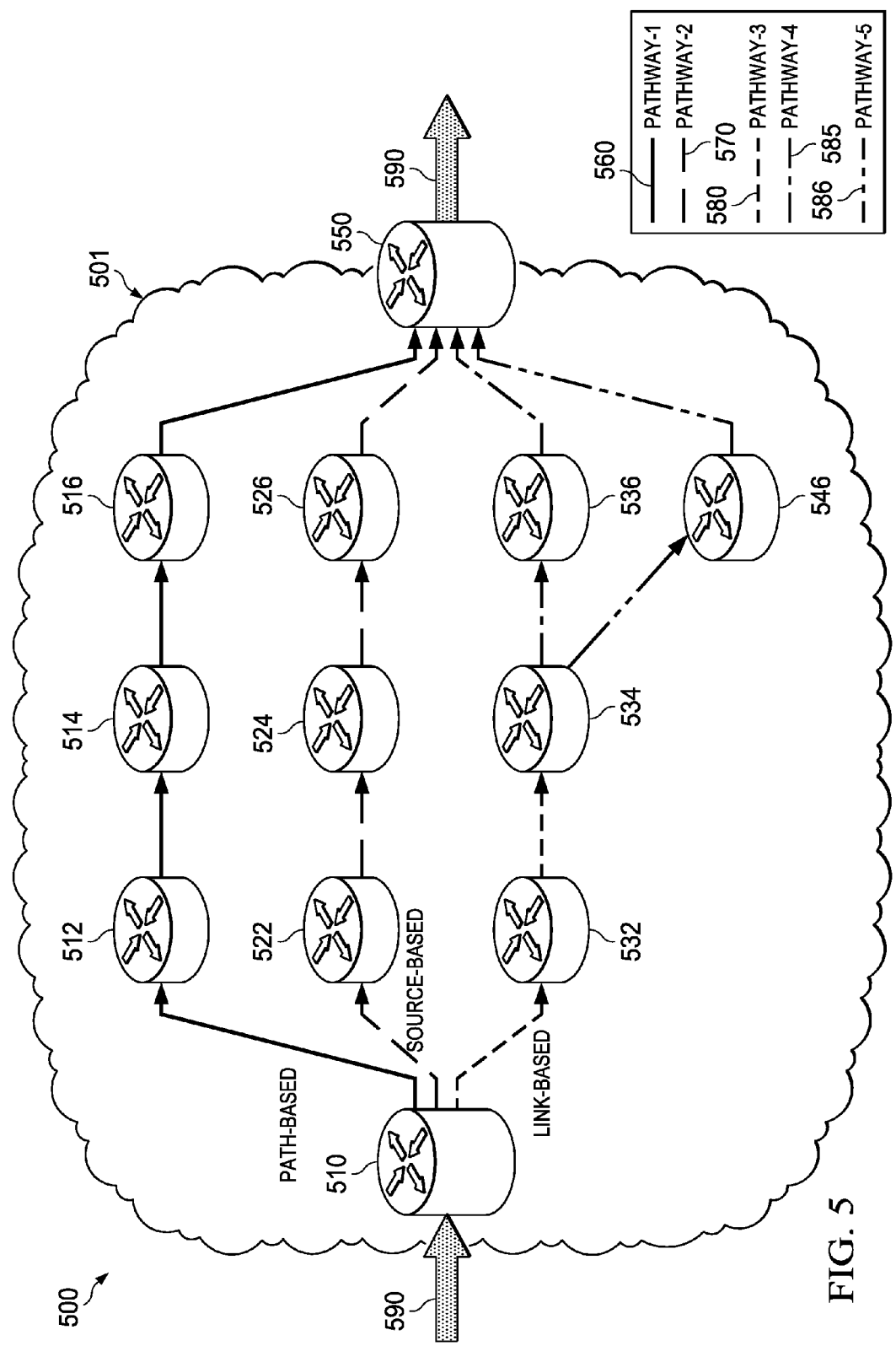
FIG. 5 illustrates a diagram of an embodiment network adapted to utilize multiple different flow splitting protocols simultaneously.

In some embodiments, different routing/splitting protocols are used over different pathways. FIG. 5 illustrates an embodiment network 500 for forwarding different portions of a traffic flow over different pathways in accordance with different routing protocols. In this example, the ingress node 510 splits a traffic flow 590 over three pathways 560, 570, 580 of a packet switched domain 501. The portion of the traffic flow 590 is forwarded over the pathway 560 in accordance with a path-based routing protocol, the portion of the traffic flow 590 is forwarded over the pathway 570 in accordance with a source-based routing protocol, and the portion of the traffic flow 590 is forwarded over the pathway 580 in accordance with a link-based routing protocol. Notably, the portion of the traffic flow 590 forwarded over the pathway 580 is further split over the pathways 585, 586 at the intermediate node 534.

Figure 6:
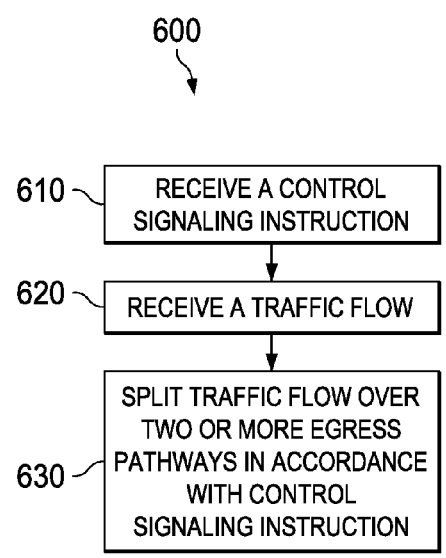
FIG. 6 illustrates a flowchart of an embodiment method for performing flow splitting in accordance with a dynamically configured flow splitting protocol.

Aspects of this disclosure provide methods for splitting traffic flows in accordance with flow splitting protocols configured by SDN signaling. FIG. 6 illustrates a method 600 for splitting traffic flows in accordance with SDN signaling, as might be performed by a network node. As shown, the method 600 begins with step 610, where the network node receives a control signaling instruction instructing the network node to split a traffic flow. The control signaling instruction may further instruct the network node to forward portions of the traffic flow over different paths using one or more forwarding protocols. For example, the FIB control signaling instruction may indicate one, or a combination, of a source-based forwarding protocol, a path-based forwarding protocol, and a link-based forwarding protocol. Next, the method 600 proceeds to step 620, where the network node receives a traffic flow. Thereafter, the method 600 proceeds to step 630, where the network node splits the traffic flow over two or more egress pathways in accordance with the control signaling instruction.

One type of source-based transport protocol is the multi-protocol-label-switching (MPLS) protocol. One type of path-based transport protocol comprises the open-shortest-path-first (OSPF) protocol. One type of link-based transport protocol is the greedy-face-greedy (GFG) protocol. The GFG protocol is discussed in the Journal Article "Routing with Guaranteed Delivery in Ad Hoc Wireless Networks" Wireless Networks, vol. 7, no. 6, pp. 609-616 (2001), which is incorporated by reference herein as if reproduced in its entirety. These are only a few examples of link-based, source-based, and path-based transport protocols.

Aspects of this disclosure provide FIB mechanisms for source-based transport protocols. In one example, an FIB entry specifies <flow ID, complete route, [flow splitting info,] ... >. In another example, one FIB entry specifies <flow ID, path ID, [flow splitting info,] ... >, and then another FIB entry separately specifies <path ID, complete path info, ... >. FIB tables may be maintained at ingress nodes (e.g., source nodes), and updated by SDN controllers. An entry may be updated whenever a corresponding TE decision changes. Entries of terminated/inactive flows may be deleted.

Aspects of this disclosure provide FIB mechanisms for path-based transport. In an embodiment, an FIB entry specifies <path ID, next hop (link ID), [destination ID,] ... >. FIB tables for path-based transport may be maintained at individual nodes and populated upfront for potential destinations.

Aspects of this disclosure provide FIB mechanisms for link-based transport. In an embodiment, an FIB entry specifies <link ID, flow ID, [flow splitting info,] [destination ID,] ... >. FIB tables for link-based transport may be maintained at individual nodes and updated by the SDN controller. An entry may be updated whenever the corresponding TE decisions change. Entries of terminated/inactive flows may be deleted. Multi-type FIBs may co-exist separately or be unified into a single FIB.

Aspects of this disclosure provide TE control signaling for supporting multi-type transport protocols. In an embodiment, an SDN controller updates FIB at network nodes via update signaling. An FIB update signal may carry traffic engineering (TE) decision items associated with a transport type field as follows: <(TYPE, decision item 1); (TYPE, decision item 2); ... >, where the TYPE indicates what transport mechanism the decision is associated with, and where a TE decision item includes information for updating existing entries or adding new entries in an FIB table. TE decision content may be different for different TYPE values. FIB update signals may be sent to traffic sources, route segment starting points (local sources), and/or individual en-route nodes.

Aspects of this disclosure provide routing header structures for supporting various transport mechanisms. An embodiment routing header may have the following structure: <flow ID, TYPE, [routing information], ... >. The TYPE field may indicate which transport mechanism is being used, e.g., source-based, path-based, link-based, etc. The routing information field content may include a format and/or content that is associated with the TYPE value. For source-based transport, the routing information field may include a complete route, e.g., MPLS label stack, etc. For path-/link based transport, the routing information field may either include a destination/path ID or otherwise be empty. A packet's routing header may be updated along the routing path as different transport mechanisms are alternated. En-route nodes may check their FIB tables to find out which transport mechanism to use, and update the TYPE field and the routing information field accordingly. The flow ID field may generally remain unchanged.

Figure 7:
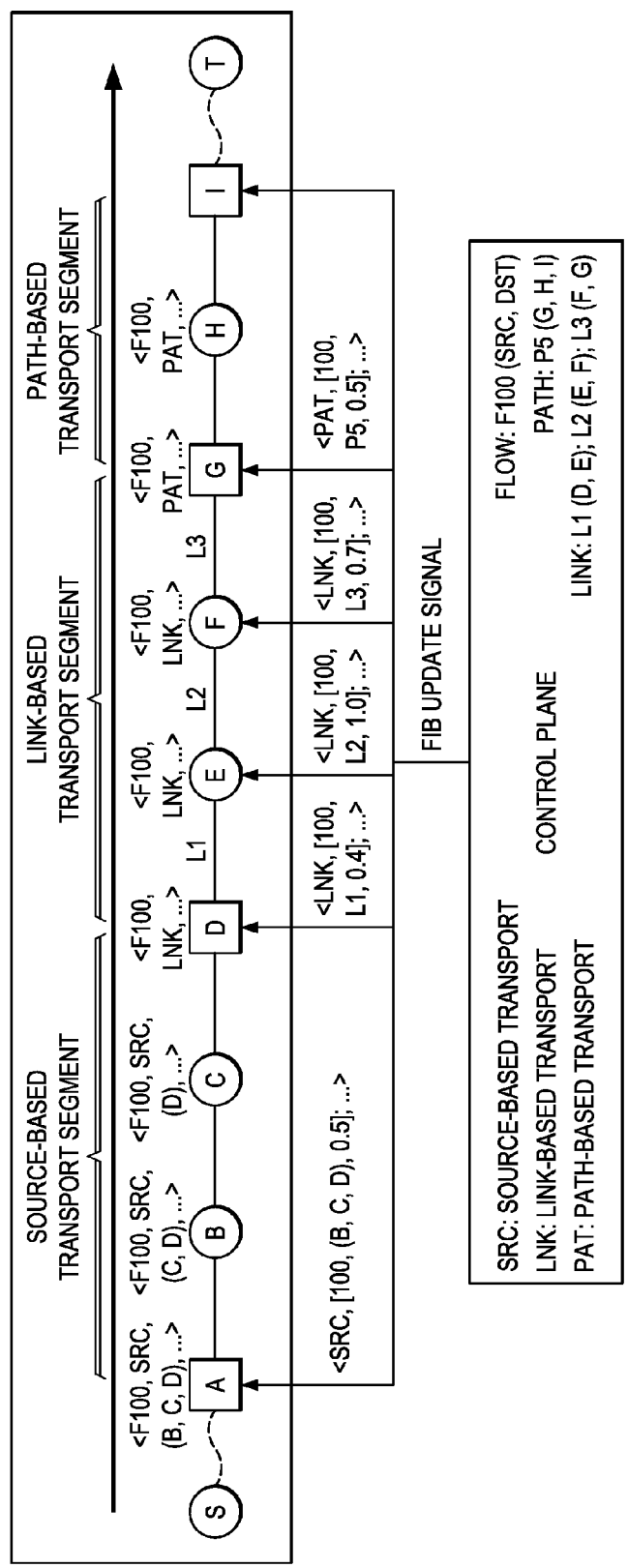
FIG. 7 illustrates a diagram of embodiment network architecture for configuring different transport protocols nodes over different path-segments of an end-to-end path.

Aspects of this disclosure allow different transport mechanisms to be configured for different segments of an end-to-end path. FIG. 7 illustrates an embodiment network architecture for configuring different nodes on an end-to-end path to use different transport protocols through SDN signaling. In this example, the SDN controller may dynamically configure TE policies by sending control signals to en-route nodes. The control signals may instruct the en-route nodes to update their FIB tables prior to receiving the traffic flow.

Figure 8:
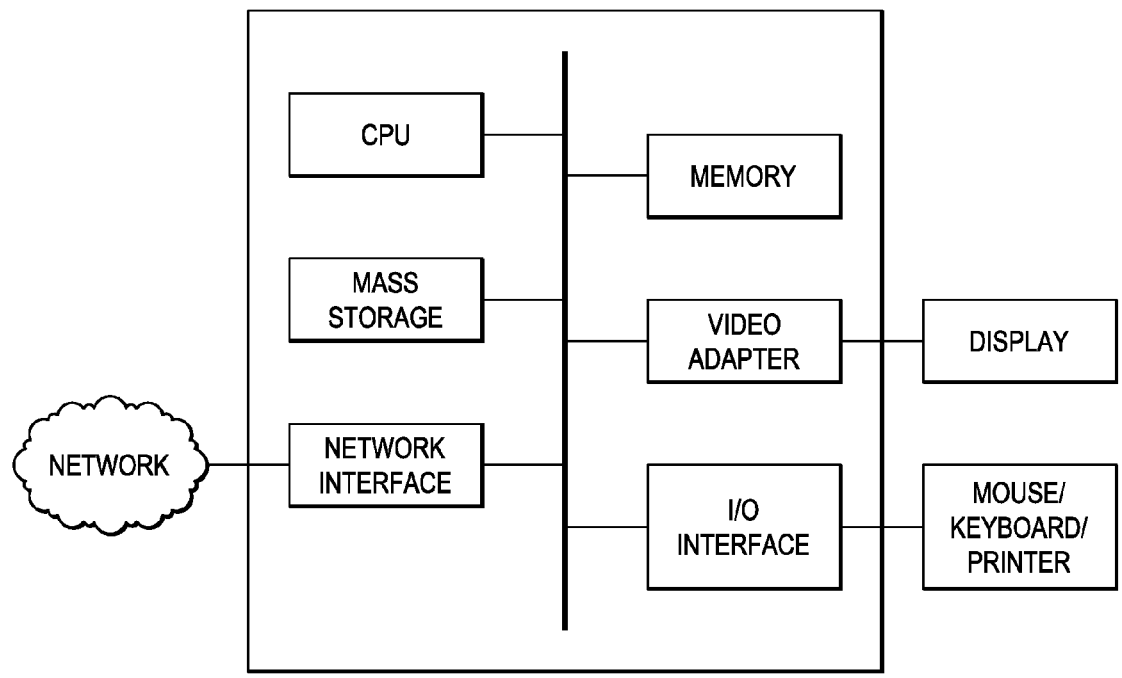
FIG. 8 illustrates a diagram of an embodiment computing platform.

FIG. 8 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 9:
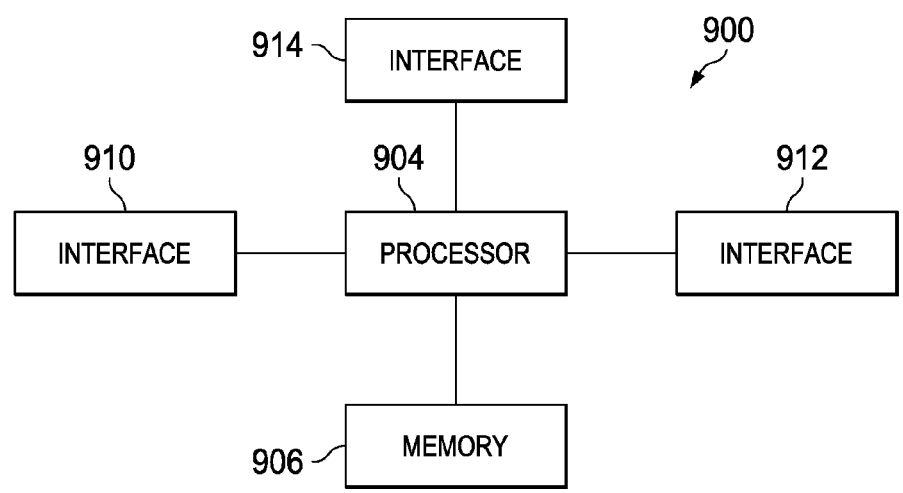
FIG. 9 illustrates a diagram of an embodiment communications device.

FIG. 9 illustrates a block diagram of an embodiment of a communications device 900, which may be equivalent to one or more devices (e.g., network node, controller, etc.) discussed above. The communications device 900 may include a processor 904, a memory 906, and a plurality of interfaces 910, a supplemental interface 912, and a backhaul interface 914, which may (or may not) be arranged as shown in FIG. 9. The processor 904 may be any component capable of performing computations and/or other processing related tasks, and the memory 906 may be any component capable of storing programming and/or instructions for the processor 904. The interfaces 910, 912, 914 may be any component or collection of components that allows the communications device 900 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
   receiving, by a network node in a packet switched domain, a control signaling instruction from a controller, wherein the control signaling instruction comprises routing information, the routing information indicating at least one egress next-hop or egress pathway and at least one of a link-based flow transport protocol, a path-based flow transport protocol, and a source-based flow transport protocol, and wherein the at least one egress next-hop or egress pathway corresponds to one of the flow transport protocols;
   receiving, by the network node, a traffic flow or a traffic flow portion over an ingress link; and
   transmitting, by the network node, the traffic flow or the traffic flow portion to next-hop network nodes over the at least one egress next-hop or egress pathway.

2. The method of claim 1, wherein routing information further comprise a protocol type field, and the protocol type field indicates at least one protocol type of a link-based flow transport protocol, a path-based flow transport protocol, and a source-based flow transport protocol.

3. The method of claim 1, wherein the control signaling instruction indicates the path-based transport protocol or the source-based transport protocol, and wherein transmitting the traffic flow or the traffic flow portion to next-hop network nodes over the at least one egress next-hop or egress pathway comprises:
   appending path information to packets in the respective portions of the traffic flow prior to forwarding respective portions of the traffic flow over the at least one egress next-hop or egress pathway.

4. The method of claim 3, wherein the path information includes a path identifier when the control signaling instruction indicates the path-based transport protocol, and
   wherein the path information includes a list of next-hop identifiers when the control signaling instruction indicates the source-based transport protocol, the list of next-hop identifiers defining next-hop network nodes along the corresponding egress pathway.

5. The method of claim 4, wherein the list of next-hop identifiers is excluded from packets in the respective portions of the traffic flow when the control signaling instruction indicates the path-based transport protocol.

6. The method of claim 1, wherein the method further comprises:
   splitting, by the network node, the traffic flow or the traffic flow portion into at least two sub traffic flows based on a splitting rule carried in the control signaling instruction prior to transmitting the traffic flow or the traffic flow portion to the next-hop network nodes over the at least one egress next-hop or egress pathway.

7. The method of claim 6, wherein splitting the traffic flow or the traffic flow portion into at least two sub traffic flows based on the splitting rule carried in the control signaling instruction comprises:
   communicating a first portion of the traffic flow over a first egress pathway; and
   communicating a second portion of the traffic flow over a second egress pathway.

8. The method of claim 7, wherein a first subset of packets in the first portion of the traffic flow are excluded from the second portion of the traffic flow.

9. The method of claim 8, wherein a second subset of packets in the first portion of the traffic flow are included in the second portion of the traffic flow such that the second portion of the traffic flow is partially redundant with the first portion of the traffic flow.

10. The method of claim 9, wherein the flow splitting information specifies a maximum redundancy threshold between the first portion of the traffic flow and the second portion of the traffic flow, the maximum redundancy threshold constraining the amount of redundancy between portions of the traffic flow split over the first egress pathway and the second egress pathway.

11. The method of claim 7, wherein the second egress pathway diverges from the first egress pathway.

12. A network node in a packet switched domain, the network node comprising:
   a processor; and
   a computer readable storage medium storing programming for execution by the processor, the programming including instructions to:
   receive a control signaling instruction from a controller, wherein the control signaling instruction comprises routing information, the routing information indicating at least one egress next-hop or egress pathway and at least one of a link-based flow transport protocol, a path-based flow transport protocol, and a source-based flow transport protocol, and wherein the at least one egress next-hop or egress pathway corresponds to one of the flow transport protocols;
   receive a traffic flow or a traffic flow portion over an ingress link; and
   transmit the traffic flow or the traffic flow portion to next-hop network nodes over the at least one egress next-hop or egress pathway.

13. A method for implementing flow splitting in software defined networking (SDN) topologies, the method comprising:
   communicating, by a controller, a control signaling instruction to a network node of a packet switched domain, wherein the control signaling instruction comprises routing information, the routing information indicating at least one egress next-hop or egress pathway and at least one of a link-based flow transport protocol, a path-based flow transport protocol, and a source-based flow transport protocol, and wherein the at least one egress next-hop or egress pathway corresponds to one of the flow transport protocols, and wherein the routing information prompts the network node to forward a traffic flow or traffic flow portion over the at least one egress next-hop or egress pathway of the packet switched domain in accordance with a forwarding protocol indicated by the control signaling instruction.

14. The method of claim 13, wherein the control signaling instruction includes a splitting rule instructing the network node split the traffic flow or the traffic flow portion into at least two sub traffic flows.

15. The method of claim 14, wherein there is at least some redundancy between the at least two sub traffic flows.

16. The method of claim 14, wherein the control signaling instruction indicates the path-based transport protocol or the source-based transport protocol, and wherein splitting the traffic flow over two or more egress pathways comprises:

appending path information to packets in the respective portions of the traffic flow prior to forwarding respective portions of the traffic flow over the two or more egress pathways.

17. The method of claim 16, wherein the path information includes a path identifier when the control signaling instruction indicates the path-based transport protocol, and wherein the path information includes a list of next-hop identifiers when the control signaling instruction indicates the source-based transport protocol, the list of next-hop identifiers defining next-hop network nodes along the corresponding egress pathway.

18. The method of claim 13, wherein the control signaling instruction indicates the link-based transport protocol, and wherein the method further comprises:

sending, by the network node, additional control signaling instructions to downstream nodes, wherein the additional control signaling instructions directly instruct the downstream nodes to forward portions of the traffic flow over next-hops along one or more pathways.

19. A controller comprising:

a processor; and a computer readable storage medium storing programming for execution by the processor, the programming including instructions to:

communicate a control signaling instruction to a network node of a packet switched domain, wherein the control signaling instruction comprises routing information, the routing information indicating at least one egress next-hop or egress pathway and at least one of a link-based flow transport protocol, a path-based flow transport protocol, and a source-based flow transport protocol, and wherein the at least one egress next-hop or egress pathway corresponds to one of the flow transport protocols, and wherein the routing information prompts the network node to forward a traffic flow or traffic flow portion over the at least one egress next-hop or egress pathway of the packet switched domain in accordance with a forwarding protocol indicated by the control signaling instruction.

* * * * *